(12) United States Patent
Wang et al.

(10) Patent No.: US 12,278,099 B2
(45) Date of Patent: Apr. 15, 2025

(54) ION TRAP APPARATUS AND SADDLE POINT MOVING METHOD FOR ION TRAP APPARATUS

(71) Applicant: SOUTHERN UNIVERSITY OF SCIENCE AND TECHNOLOGY, Shenzhen (CN)

(72) Inventors: Zhao Wang, Shenzhen (CN); Qinglin Ma, Shenzhen (CN); Jiayu Guo, Shenzhen (CN); Benran Wang, Shenzhen (CN); Mingshen Li, Shenzhen (CN); Yu Wang, Shenzhen (CN)

(73) Assignee: Southern University of Science and Technology, Shenzhen (CN)

( * ) Notice: Subject to any disclaimer, the term of this patent is extended or adjusted under 35 U.S.C. 154(b) by 277 days.

(21) Appl. No.: 18/015,500

(22) PCT Filed: Jun. 17, 2022

(86) PCT No.: PCT/CN2022/099550
§ 371 (c)(1),
(2) Date: Jan. 10, 2023

(87) PCT Pub. No.: WO2022/262861
PCT Pub. Date: Dec. 22, 2022

(65) Prior Publication Data
US 2023/0260777 A1 Aug. 17, 2023

(30) Foreign Application Priority Data

Jun. 17, 2021 (CN) .......................... 202110670509.7

(51) Int. Cl.
*H01J 49/42* (2006.01)
(52) U.S. Cl.
CPC ................................ *H01J 49/424* (2013.01)

(58) Field of Classification Search
CPC ...................................................... H01J 49/424
See application file for complete search history.

(56) References Cited

U.S. PATENT DOCUMENTS

| | | | |
|---|---|---|---|
| 2015/0303047 A1 | 10/2015 | Jiang et al. | |
| 2016/0018368 A1* | 1/2016 | Sapargaliyev | H01J 49/406 250/281 |
| 2020/0243322 A1* | 7/2020 | Stewart | H01J 49/061 |

FOREIGN PATENT DOCUMENTS

| | | |
|---|---|---|
| CN | 101031990 | 9/2007 |
| CN | 104517798 | 4/2015 |
| CN | 113420882 | 9/2021 |

OTHER PUBLICATIONS

International Search Report issued in PCT/CN2022/099550 dated Aug. 30, 2022.

(Continued)

*Primary Examiner* — Nicole M Ippolito
(74) *Attorney, Agent, or Firm* — Hogan Lovells US LLP

(57) ABSTRACT

The present disclosure provides an ion trap apparatus and a saddle point moving method for the ion trap apparatus. The ion trap apparatus comprises: an insulating base material, the insulating base material being a concave structure; and at least two segments of arc-shaped metal reflective electrodes, wherein the arc-shaped metal reflective electrodes cover the front side of the insulating base material, the front side being a concave surface; each segment of the arc-shaped metal reflective electrodes is electrically insulated; and each segment of the arc-shaped metal reflective electrodes is used to receive a radio frequency voltage which has the same frequency, the same phase and an adjustable amplitude. The apparatus may achieve ideal imaging while improving the light collection efficiency, thereby improving the success rate of the preparation of ion-photon entangled states.

10 Claims, 8 Drawing Sheets

(56) References Cited

OTHER PUBLICATIONS

Wang, Zhao et al. "Design of a novel monolithic parabolic-mirror ion-trap to precisely align the RF null point with the optical focus" arXiv: 2004.08845v1, Apr. 19, 2020 (Apr. 19, 2020).
First Office Action issued in CN Application No. 202110670509.7, dated Apr. 6, 2022.

* cited by examiner

| Notation | Value | Comment |
|---|---|---|
| $V_1$ | 0.35 V | |
| $V_2$ | 819.20 V | |
| $V_3$ | 541.00 V | |
| $V_4$ | 712.75 V | |
| $V_5$ | 0.50 V | |
| $m$ | 171 u | ion's mass |
| $Q$ | 1 e | ion's charge |
| $\Omega$ | 20 MHz | RF frequency |
FIG. 13
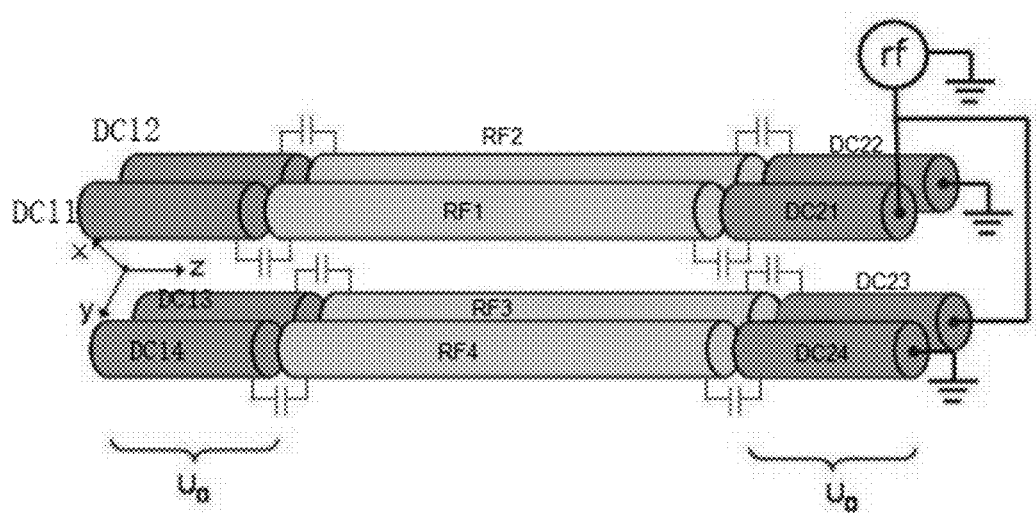
FIG. 14
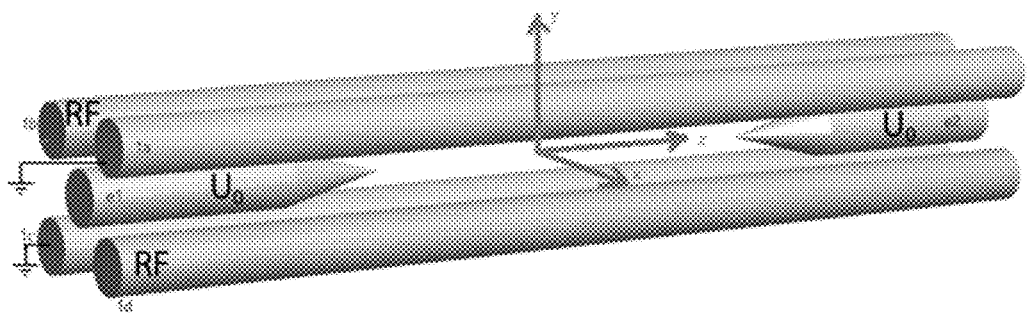
FIG. 15

ION TRAP APPARATUS AND SADDLE POINT MOVING METHOD FOR ION TRAP APPARATUS

CROSS-REFERENCE TO RELATED APPLICATION

The present disclosure claims the priority to the Chinese patent application with the filing No. 202110670509.7 filed with the Chinese Patent Office on Jun. 17, 2021, and entitled "Ion Trap Apparatus and Saddle Point Moving Method for Ion Trap Apparatus", the contents of which are incorporated herein by reference in entirety.

TECHNICAL FIELD

The present disclosure relates to the technical field of quantum networks, in particular to an ion trap device (i.e., an ion trap apparatus) and a saddle point moving method of an ion trap device.

BACKGROUND ART

In the process of realizing the exchange of quantum information in the quantum network, the form of quantum bits needs to be converted. Taking the ion trap system as an example, the carrier of quantum bits is a single charged atom (ion), and each ion is one quantum bit, which can realize storage and calculation of local quantum information. If quantum information needs to be transmitted over kilometers, it is not feasible to directly use mobile ions. By using the method of converting ion quantum bits into photon quantum bits, long-distance quantum information transmission can be realized through optical media.

The conversion process of the ion-photon quantum bits information is as follows: the electronic of the atomic ion is coherently excited to a high energy level by a continuous or ultrafast pulse laser, and when the ion radiates a photon, the ion and the photon can realize the state of the entanglement. If the photons emitted by ions can be collected with certainty, the ion-photon entangled state can be realized deterministically. However, the maximum solid angle of photon radiation is $4\pi$, so the efficiency of light collection determines the success rate of successful preparation of an ion-photon entangled state.

SUMMARY

Embodiments of the present disclosure provide an ion trap device, which can be used for improving the efficiency of light collection and realizing ideal imaging, thereby improving the success rate of preparation of ion-photon entangled state.

The embodiments of the present disclosure provide an ion trap device, including:
  an insulating substrate, the insulating substrate having a concave structure; and
  at least two arc-shaped (curved-shape) metal reflective electrodes, the arc-shaped metal reflective electrodes covering a front surface of the insulating substrate, the front surface being a concave surface, and the arc-shaped metal reflective electrodes being electrically insulated from each other, wherein
  each of the arc-shaped metal reflective electrodes is configured to receive a RF voltage (i.e., radio-frequency voltage) with a same frequency, a same phase and an adjustable amplitude; and/or, each of the arc-shaped metal reflective electrodes is configured to receive a DC voltage (i.e., direct-current voltage) with an adjustable amplitude.

In an embodiment, the ion trap device further includes a plurality of contact electrodes located on a back surface of the insulating substrate, the insulating substrate being provided with through holes, and each of the arc-shaped metal reflective electrodes being connected to respective one of the contact electrodes one by one through respective one of the through holes.

In an embodiment, at least two of the arc-shaped metal reflective electrodes are in a same plane, and the plane is perpendicular to an optical axis of the insulating substrate.

In an embodiment, at least two of the arc-shaped metal reflective electrodes are symmetrical with respect to the optical axis of the insulating substrate.

In an embodiment, the method further includes:
  at least one annular metal reflective electrode, wherein the annular metal reflective electrode covers the front surface of the insulating substrate and is electrically insulated from the arc-shaped metal reflective electrodes; each annular metal reflective electrode is symmetrical with respect to an optical axis of the insulating substrate; and
  each annular metal reflective electrode is configured to receive a RF voltage with the same frequency, the same phase and an adjustable amplitude, and/or configured to receive a DC voltage with an adjustable amplitude.

In an embodiment, the ion trap device further includes a plurality of contact electrodes located on the back surface of the insulating substrate, the insulating substrate being provided with through holes, and each annular metal reflective electrode is connected to respective one of the contact electrodes one by one through respective one of the through holes on the insulating substrate.

In an embodiment, at least three of the arc-shaped metal reflective electrodes are in the first plane, at least one of the annular metal reflective electrodes is in the second plane, and the first plane and the second plane are perpendicular to the optical axis of the insulating substrate.

In an embodiment, the concave structure is any one of a paraboloid, a sphere, a cylinder and an ellipsoid.

In an embodiment, the number of the arc-shaped metal reflective electrodes is 4n segments, and every four of the arc-shaped metal reflective electrodes is a group, wherein n is a positive integer greater than or equal to 1; and
  multi-segment arc-shaped metal reflective electrodes in the same group are in the same plane and symmetrical with respect to the optical axis of the insulating substrate, and the plane is perpendicular to the optical axis of the insulating substrate.

In an embodiment, at least three of the arc-shaped metal reflective electrodes are in a first plane, at least one of the arc-shaped metal reflective electrodes is in a second plane, and the first plane and the second plane are perpendicular to the optical axis of the insulating substrate.

In an embodiment, the ion trap device includes a plurality of electrodes insulated from each other, and the method includes:
  controlling a saddle point to move independently in three dimensions by applying a RF voltage with a same phase, a same frequency and an adjustable amplitude to each of the electrodes.

In an embodiment, the controlling a saddle point to move independently in three dimensions by applying a RF voltage with a same phase, a same frequency and an adjustable amplitude to each of the electrodes includes:

controlling the saddle point to move independently in the z axis direction by simultaneously applying RF voltages with the same phase, the same frequency and the same amplitude increment to a plurality of the electrodes symmetrical with respect to the z axis in the x-y plane.

In an embodiment, the controlling a saddle point to move independently in three dimensions by applying a RF voltage with a same phase, a same frequency and an adjustable amplitude to each of the electrodes includes:

controlling the saddle point to move independently in a direction close to the z axis or away from the z axis in a plane perpendicular to the z axis by simultaneously applying RF voltages with a same phase, a same frequency and an adjustable amplitude to the electrodes in the x-y plane.

In an embodiment, the method further includes:

controlling an ion equilibrium position to move along the direction by applying positive and negative DC voltages to at least two of the electrodes distributed along a same direction, respectively.

In an embodiment, the ion trap device includes: an insulating substrate, the insulating substrate having a concave structure; and at least two arc-shaped metal reflective electrodes, the arc-shaped metal reflective electrodes covering a front surface of the insulating substrate, the front surface being a concave surface, and the arc-shaped metal reflective electrodes being electrically insulated from each other; wherein each of the arc-shaped metal reflective electrodes is configured to receive a RF voltage with a same frequency, a same phase and an adjustable amplitude, and the controlling a saddle point to move independently in three dimensions by applying a RF voltage with a same phase, a same frequency and an adjustable amplitude to each of the electrodes includes:

controlling the saddle point to move independently in three dimensions by applying a RF voltage with a same phase, a same frequency and an adjustable amplitude to each of the arc-shaped metal reflective electrodes.

In an embodiment, the at least two arc-shaped metal reflective electrodes are in a same plane perpendicular to an optical axis of the insulating substrate and are symmetrical with respect to the optical axis of the insulating substrate, and the controlling the saddle point to move independently in three dimensions by applying a RF voltage with a same phase, a same frequency and an adjustable amplitude to each of the arc-shaped metal reflective electrodes includes:

controlling the saddle point to move independently in an optical axis direction by simultaneously applying RF voltages with a same phase, a same frequency and a same amplitude increment to at least two of the arc-shaped metal reflective electrodes.

In an embodiment, at least two of the arc-shaped metal reflective electrodes are in a same plane perpendicular to an optical axis of the insulating substrate, and the controlling the saddle point to move independently in three dimensions by applying a RF voltage with a same phase, a same frequency and an adjustable amplitude to each of the arc-shaped metal reflective electrodes includes:

controlling the saddle point to move in a direction away from the optical axis or close to the optical axis independently by simultaneously applying RF voltages with a same phase, a same frequency and different amplitude increments to at least two of the arc-shaped metal reflective electrodes.

In an embodiment, the ion trap device further includes at least one annular metal reflective electrode, and each annular metal reflective electrode is symmetrical with respect to an optical axis of the insulating substrate, the method further includes:

controlling the saddle point to move independently in the optical axis direction by applying a RF voltage with a same phase, a same frequency and an adjustable amplitude to each annular metal reflective electrode.

In an embodiment, the controlling the saddle point to move independently in the optical axis direction by simultaneously applying a RF voltage with a same phase, a same frequency and an adjustable amplitude to each annular metal reflective electrode includes:

Moving a position of the saddle point to a preset position of the ion trap device by applying a RF voltage with a same phase, a same frequency and an adjustable amplitude to each annular metal reflective electrode.

In an embodiment, the moving a position of the saddle point to a preset position of the ion trap device by applying a RF voltage with a same phase, a same frequency and an adjustable amplitude to each annular metal reflective electrode includes:

moving the position of the saddle point to a focus position of the ion trap device by applying a RF voltage with a same phase, a same frequency and an adjustable amplitude to each annular metal reflective electrode.

In an embodiment, the method includes:

controlling movement of an ion equilibrium position by applying a DC voltage to each of the arc-shaped metal reflective electrodes.

In an embodiment, the controlling movement of an ion equilibrium position by applying a DC voltage to each of the arc-shaped metal reflective electrodes includes:

moving the ion equilibrium position to a position of the saddle point by applying a DC voltage to each of the arc-shaped metal reflective electrodes.

In an embodiment, the moving the ion equilibrium position to a position of the saddle point by applying a DC voltage to each of the arc-shaped metal reflective electrodes includes:

controlling the ion equilibrium position to move along the direction by applying positive and negative DC voltages to at least two of the arc-shaped metal reflective electrodes distributed along a same direction, respectively.

In an embodiment, the method includes:

controlling movement of an ion equilibrium position by applying a DC voltage to each of the arc-shaped metal reflective electrodes and/or each annular metal reflective electrode.

In an embodiment, the controlling movement of an ion equilibrium position by applying a DC voltage to each of the arc-shaped metal reflective electrodes and/or each annular metal reflective electrode includes:

moving the ion equilibrium position to a position of the saddle point by applying a DC voltage to each of the arc-shaped metal reflective electrodes and/or each annular metal reflective electrode.

The ion trap device provided by the embodiments of the present disclosure integrates the concave structure with high reflectivity and an ion trap electrode, making the whole structure more compact, easy to be miniaturized and integrated, and is suitable for use as a node device of a quantum network. The ion trap device can realize the movement of the saddle point of the RF electric field without a mechanical device by adjusting the RF voltage, thus realize ideal imaging. The device can move the RF saddle point in three directions at the same time, which is greatly improved compared with the previous device that can only move the ion saddle point in the optical axis direction. Using the characteristic that different RF voltages can simultaneously compensate RF saddle points in three directions, the constraint on the machining accuracy of concave structure and its top electrode can be relaxed, making the structure easier to realize. The concave-structure ion trap has high efficiency of light collection close to 4π solid angle, which can greatly improve the probability of successfully collecting single photon radiated by ion, thus improve the probability of success and the speed of preparation of ion-photon entangled state and ion-ion entangled state.

BRIEF DESCRIPTION OF DRAWINGS

In order to illustrate the technical solutions of the embodiments of the present disclosure more clearly, a brief description of the accompanying drawings required for illustration of the embodiments of the is presented below.

FIG. 13 is a schematic diagram of the RF voltage of electrodes 1 to 5, the frequency and the parameters of ions to be trapped provided by an embodiment of the present disclosure;

FIG. 14 is a structural schematic diagram of a segmented quadrupole trap;

FIG. 15 is a structural schematic diagram of a quadrupole rod ion trap;

DETAILED DESCRIPTION OF EMBODIMENTS

Figure 1:
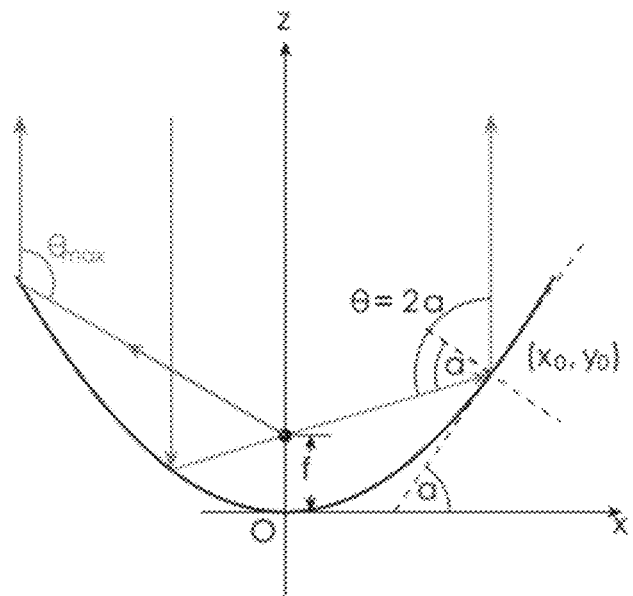
FIG. 1 is a schematic diagram of paraboloid reflecting a point light source at the focus.

The technical solutions in the embodiments of the present disclosure will be described below with reference to the accompanying drawings of the embodiments of the present disclosure.

Similar reference numerals and letters indicate similar items in the following drawings, so once an item is defined in one drawing, it does not need to be further defined and explained in subsequent drawings. Meanwhile, in the description of the present disclosure, the terms "first" and "second" are only intended to distinguish descriptions, and shall not be understood as indicating or implying relative importance.

In order to improve the collection efficiency of ion radiation photons, during the research and development process, the inventor found that Solution 1 realized high efficiency of photon collection by using a parabolic mirror as the photon collection device. But it only serves as a light collection device, and it is functionally separate from the ion trap electrode that traps ions. After that, Solution 2 was found, and an integrated device was conceived, which used the metal layer of the parabolic reflector to realize the integration of the ion trap electrode and the paraboloid. However, this conception cannot adjust the saddle point of the trapped RF (radio frequency) potential field generated by the paraboloid electrode, so it cannot guarantee the accurate coincidence of the RF saddle point and the focus of the paraboloid.

The significance of the coincidence of the saddle point and the focus lies in the fact that paraboloid can collect light with a large solid angle, thus improving the efficiency of light collection, and improving the imaging resolution (the resolution is 1.22 ANA, where NA is positively correlated with the solid angle). However, the paraboloid only meets the ideal imaging condition with no aberration at the focus. FIG. 1 is a schematic diagram of paraboloid reflecting a point light source at the focus. Any light emitted from a point light source at the focus is reflected by the paraboloid and output in parallel. Therefore, only when the ion to be imaged is placed at the focus, the ideal imaging can be realized.

Accordingly, an embodiment of the present disclosure provides an ion trap device for adjusting the saddle point of the potential field generated by the electrode. A saddle point is a position where the potential is stable (i.e., the first derivative of the potential energy is 0).

Embodiment 1

Figure 2:
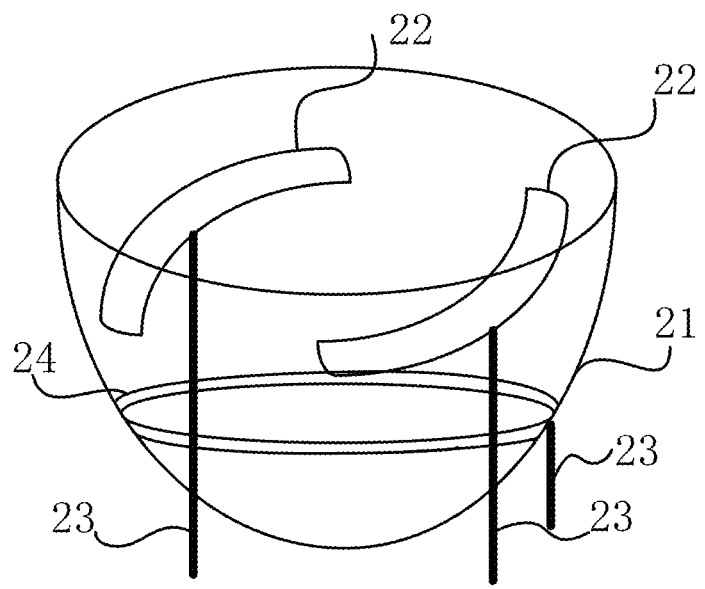
FIG. 2 is a structural schematic diagram of an ion trap device provided by an embodiment of the present disclosure.

FIG. 2 is a structural schematic diagram of an ion trap device provided by an embodiment of the present disclosure. The ion trap device includes an insulating substrate 21, two arc-shaped metal reflective electrodes 22 and a plurality of contact electrodes 23.

The insulating substrate 21 has a concave structure. The concave structure may be any one of paraboloid, sphere, cylinder and ellipsoid.

The arc-shaped reflective electrodes 22 covers the front surface of the insulating substrate 21, which is a concave surface, such as a concave surface of a paraboloid. Each of the arc-shaped metal reflective electrodes 22 is electrically insulated from each other. The size of each of the arc-shaped metal reflective electrodes 22 may be the same or different. Assuming that there are at least three arc-shaped metal reflective electrodes 22, the gaps between two adjacent arc-shaped metal reflective electrodes 22 may be the same or different. Each of the arc-shaped metal reflective electrodes 22 is configured to receive a RF voltage with the same frequency, the same phase and an adjustable amplitude. By applying a RF voltage with the same phase, the same frequency and an adjustable amplitude to each of the arc-shaped metal reflective electrodes, the saddle point can be controlled to move independently in three dimensions. Therefore, by changing the magnitude of the RF voltage, the position of the saddle point of the trapped RF electric field generated by the arc-shaped metal reflective electrodes 22 can be adjusted, so that the saddle point of the trapped RF electric field coincides with the focus of the concave structure.

The arc-shaped metal reflective electrode 22 has both functions of conducting electrode and high reflectivity. In an embodiment, the structure of the arc-shaped metal reflective electrodes 22 may be formed by covering a non-conductive insulating high reflective dielectric film on the metal electrode.

A plurality of contact electrodes 23 are located on the back surface of the insulating substrate 21, where the back surface includes a side surface and a lower surface. The insulating substrate 21 is provided with through holes, and each of the arc-shaped metal reflective electrodes 22 are connected to respective one of the contact electrodes 23 one by one through respective one of the through holes. In an embodiment, the back surface may be a convex surface (as shown in FIG. 2), a plane, or any other curved surface. As shown in FIG. 2, one arc-shaped metal reflective electrode 22 corresponds to one contact electrode 23. The insulating substrate 21 is provided with through holes, and the through hole may be filled with metal, so that the contact electrode 23 is electrically connected to the arc-shaped metal reflective electrodes 22 on the front surface.

In an embodiment, as shown in FIG. 2, the two arc-shaped metal reflective electrodes 22 are in the same plane, and the plane is perpendicular to the optical axis of the insulating substrate 21. The two arc-shaped metal reflective electrodes 22 are symmetrical with respect to the optical axis of the insulating substrate 21. The saddle point can be controlled to move in the optical axis direction by applying RF voltages with the same phase, the frequency and the amplitude to the two arc-shaped metal reflective electrodes. The saddle point is controlled to move in a direction away from the optical axis or close to the optical axis (i.e., the x-y plane) by applying RF voltages with the same phase, the same frequency and different amplitudes to the two arc-shaped metal reflective electrodes.

For example, supposing that the optical axis direction is z direction, the saddle point lies in the plane of two arc-shaped metal reflective electrodes 22, and RF voltages (with the same phase and the same frequency, but different amplitudes) are respectively applied to the two arc-shaped metal reflective electrodes 22, the position of the RF saddle point generated by the asymmetric RF voltage will be close to and away from the optical axis in the x-y plane with the magnitude and proportion of the voltage. Therefore, the RF saddle point can be moved in a straight line in the x-y plane (for example, to the position where x=y=0) by applying at least two specific RF voltages. If the RF voltage with the same phase, the frequency and the amplitude is applied, the symmetrical RF voltage can control the position of the saddle point to move in the z axis direction.

It should be noted that two arc-shaped metal reflective electrodes can control the saddle point to move in a straight line, three arc-shaped metal reflective electrodes can control the saddle point to move in a plane, and four arc-shaped metal reflective electrodes can control the saddle point to move arbitrarily in the three-dimensional space.

In an embodiment, each of the arc-shaped metal reflective electrodes 22 is further configured to receive a DC voltage with an adjustable amplitude. By adjusting the DC voltage applied to the arc-shaped metal reflective electrodes 22, the ion equilibrium position can be changed. After many attempts, the ion equilibrium position can be moved to the position of the RF saddle point, thus eliminating the ion micro-motion (micro-movement).

It should be noted that the stationary ion is an ideal point light source, and the micro-motion will cause the equivalent ion volume to increase, which will make it lose the characteristics of the point light source and reduce the minimum resolution of ion imaging. It will also make the light field formed by the paraboloid reflection deviate from the ideal light field of single ion point light source, resulting in the weakening of light field intensity carrying quantum information and the decline of fidelity of quantum information. The micro-motion will cause the ions to be unable to cool to the ground state of quantum motion, thus weakening the storage quality and the storage time of dynamic quantum bit information. In the process of quantum information interaction, an extremely important resource is the generation of quantum entangled states, and the success rate of photon bits deviating from the ideal light field mode will also decrease in the process of preparation of quantum entangled state.

Therefore, by applying a DC voltage with adjustable amplitude to the arc-shaped metal reflective electrodes 22, it is possible to attempt to move the ion equilibrium position to the position of the RF saddle point. When the ions are trapped in the electric field, the equilibrium position of ions is precisely at the saddle point trapped in the RF electric field, which can realize stable trapping without micro-motion, thus solving the above problems.

Embodiment 2

In Embodiment 2, the difference from the above Embodiment 1 is that there may be at least three arc-shaped metal reflective electrodes in the first plane and at least one arc-shaped metal reflective electrodes in the second plane. The first plane and the second plane are perpendicular to the optical axis of the insulating substrate. Each of the arc-shaped metal reflective electrode may not only receive a DC voltage with an adjustable amplitude separately, but also receive a RF voltage with the same frequency, the same phase and an adjustable amplitude separately, and also receive a DC voltage with an adjustable amplitude and a RF voltage with the same frequency, the same phase and an adjustable amplitude simultaneously. On the same surface, two arc-shaped metal reflective electrodes can realize one-dimensional movement. On the same surface, three arc-shaped metal reflective electrodes can move in two dimensions. Therefore, by adding at least one arc-shaped metal reflective electrode on the second plane, three-dimensional movement can be realized.

Embodiment 3

Different from the above-mentioned Embodiments 1 and 2, the ion trap device shown in FIG. 2 may further include at least one annular metal reflective electrode 24. The annular metal reflective electrode 24 covers the front surface (i.e., the concave surface) of the insulating substrate 21, and is electrically insulated from the arc-shaped metal reflective electrodes 22. Each annular metal reflective electrode 24 is symmetrical with respect to the optical axis of the insulating substrate 21. Each annular metal reflective electrode is connected to respective one of the contact electrodes 23 through respective one of the through holes on the insulating substrate 21. Each annular metal reflective electrode 24 is configured to receive a RF voltage with the same frequency, the same phase and an adjustable amplitude. In an embodiment, the annular metal reflective electrode 24 is further configured to receive a DC voltage with an adjustable amplitude.

The annular metal reflective electrode 24 may receive a RF voltage with the same frequency, the same phase and an adjustable amplitude as the arc-shaped metal reflective electrodes 22. The annular metal reflective electrode 24 is symmetrical with respect to the optical axis, so the annular metal reflective electrode 24 can separately control the saddle point to move in the z axis direction. In an embodiment, when the saddle point lies in the plane of the arc-shaped metal reflective electrodes 22, the arc-shaped metal reflective electrodes 22 control the saddle point to move in the x-y plane, the annular metal reflective electrode 24 controls the saddle point to move in the z axis direction, and the arc-shaped metal reflective electrodes 22 and the annular metal reflective electrode 24 jointly adjust the position of the saddle point.

In an embodiment, there may be at least three arc-shaped metal reflective electrodes 22 in the first plane, and at least one annular metal reflective electrode 24 in the second plane. The first plane and the second plane are perpendicular to the optical axis of the insulating substrate. Thus, the saddle point can be controlled to move in any direction in the three-dimensional space.

Embodiment 4

The number of arc-shaped metal reflective electrodes in the same plane (that is, the same layer) may be other than two in Embodiment 1 and three in Embodiment 2, such as four, five, six, etc., and the size of each of the arc-shaped metal reflective electrodes may be the same or different. The gaps between a plurality of arc-shaped metal reflective electrodes in the same plane may be equal or different. The arc-shaped metal reflective electrodes of the ion trap device may be in one layer or multiple layers.

The ion trap device may have or may not have an annular metal reflective electrode, and there may be one or more annular metal reflective electrodes.

Embodiment 4

Figure 3:
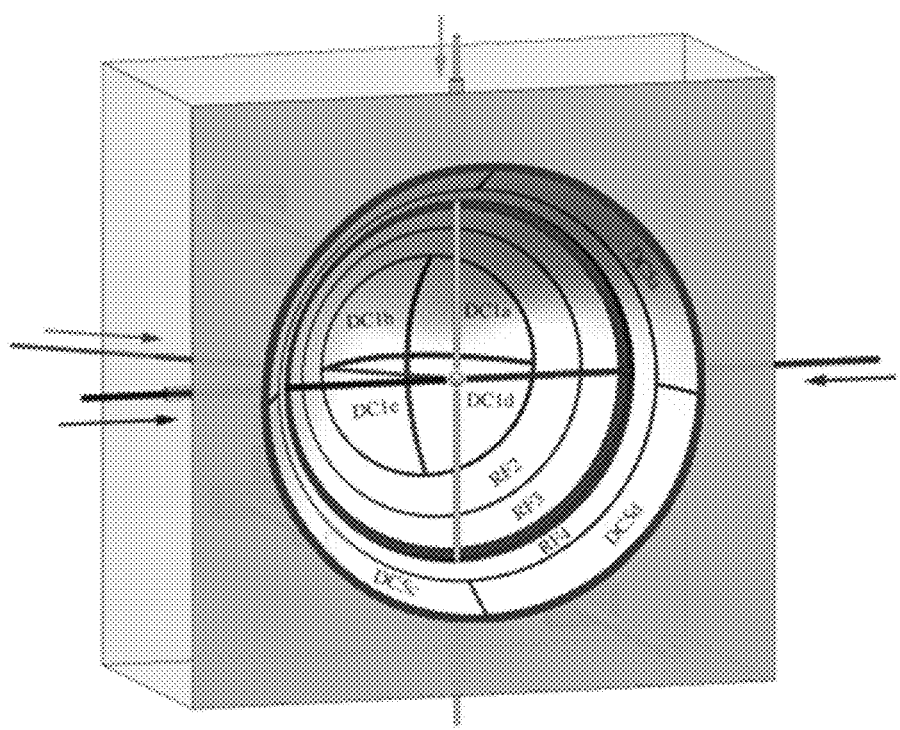
FIG. 3 is a schematic diagram of a front surface of an ion trap device provided by an embodiment of the present disclosure.

In an embodiment, the number of arc-shaped metal reflective electrodes 22 of the ion trap device may be 4n segments, where n is a positive integer greater than or equal to 1, and every four arc-shaped metal reflective electrodes 22 are a group. A plurality of arc-shaped metal reflective electrodes 22 in the same group are in the same plane (i.e., the same layer) and symmetrical with respect to the optical axis of the insulating substrate 21, and the plane is perpendicular to the optical axis of the insulating substrate 21. In FIG. 3 below, eight arc-shaped metal reflective electrodes 22 (four of which are in one layer), two layers of arc-shaped metal reflective electrodes 22 and three annular metal reflective electrodes 24 are taken as an example.

Figure 4:
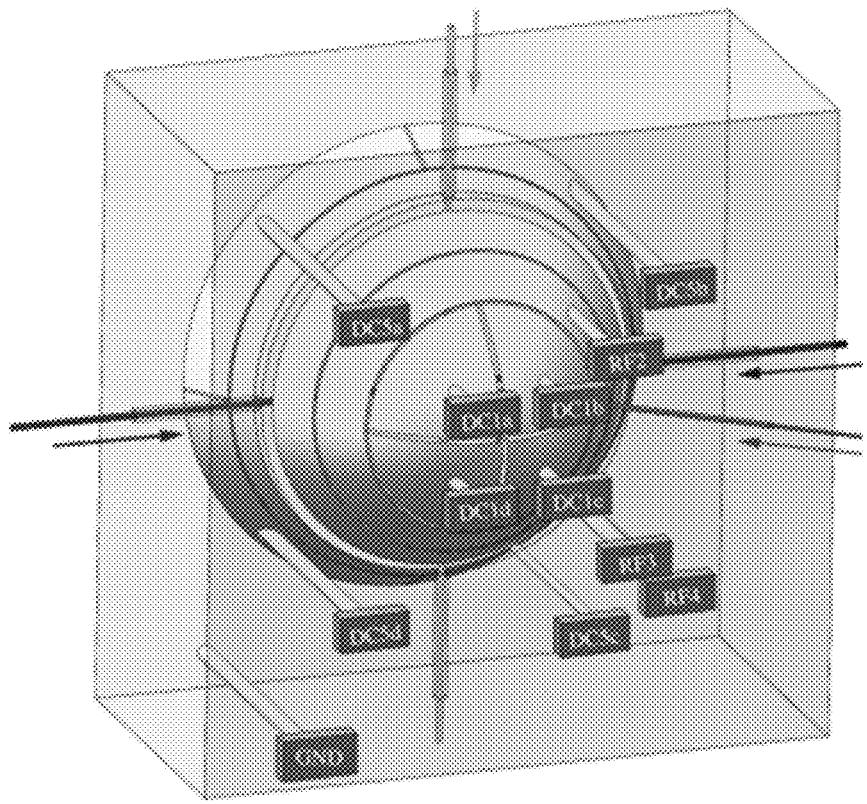
FIG. 4 is a schematic view of a back surface of the ion trap device shown in FIG. 3.
Figure 5:
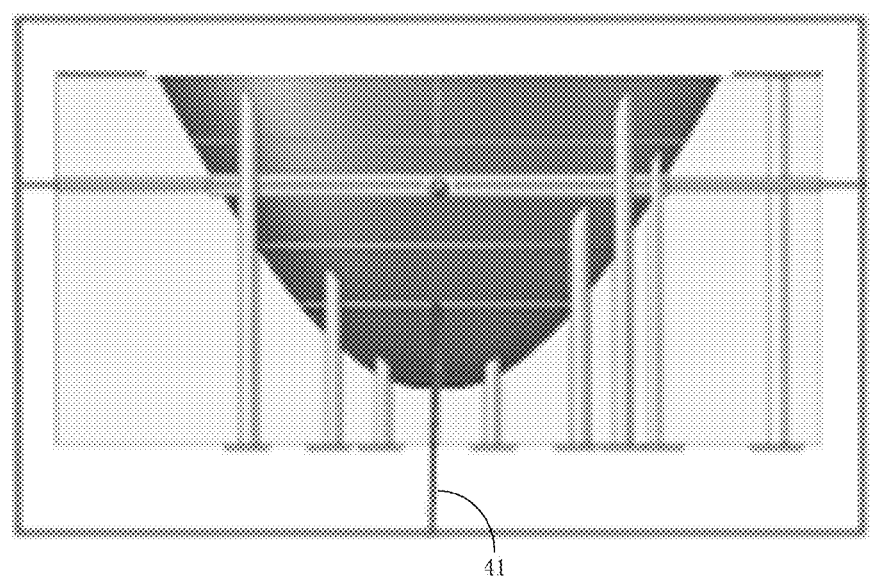
FIG. 5 is a side view of the ion trap device shown in FIGS. 3 and 4.

FIG. 3 is a schematic diagram of a front surface of an ion trap device provided by an embodiment of the present disclosure. FIG. 4 is a schematic view of a back surface of the ion trap device shown in FIG. 3. FIG. 5 is a side view of the ion trap device shown in FIGS. 3 and 4. The insulating substrate of the ion trap device is of a paraboloid structure, and the paraboloid may be obtained by performing processing, such as turning and cutting, on insulating substrates such as melted quartz. The optical axis refers to the axis of symmetry 41 of the paraboloid. As shown in FIGS. 3 to 5, the number of arc-shaped metal reflective electrodes of the ion trap device may be eight, and the number of annular metal reflective electrodes may be three.

The arc-shaped reflective electrodes DC1a, DC1b, DC1c and DC1d are a group. The arc-shaped reflective electrodes DC5a, DC5b (not shown in the figure), DC5c and DC5d are another group. The arc-shaped metal reflective electrodes DC1a, DC1b, DC1c, DC1d are in the same plane and symmetrical with respect to the optical axis. The arc-shaped metal reflective electrodes DC5a, DC5b (not shown in the figure), DC5c, DC5d lie on another plane and are symmetrical with respect to the optical axis. The gaps between the arc-shaped metal reflective electrodes in the same plane may be the same or different.

One arc-shaped metal reflective electrode corresponds to one contact electrode. The arc-shaped metal reflective electrode DC5a has a one-to-one contact electrode DC5a in FIG. 4. The insulating substrate is provided with through holes which may be filled with metal, so that the contact electrode DC5a is electrically connected to the arc-shaped metal reflective electrode DC5a on the front surface. Similarly, other arc-shaped metal reflective electrodes are electrically connected to the corresponding contact electrodes on the back surface through the respective through holes filled with metal.

The annular metal reflective electrodes RF2, RF3 and RF4 in FIG. 3 have corresponding contact electrodes RF2, RF3 and RF4 in FIG. 4, and the contact electrode is electrically connected to the annular metal reflective electrode. Three annular metal reflective electrodes RF2, RF3 and RF4 are distributed from the vertex side of the paraboloid to the opening side.

In an embodiment, a specific DC voltage may be applied to the arc-shaped metal reflective electrodes DC1a, DC1b, DC1c, DC1d (or DC5a, DC5b (not shown in the figure), DC5c, DC5d), so as to move the ion motion equilibrium position to the RF saddle point, thereby eliminating the ion micro-motion.

In an embodiment, the RF voltage may be applied to the annular metal reflective electrodes RF2, RF3 and RF4 to move the RF saddle point along the optical axis Z. By independently adjusting the amplitude of RF voltage on one or more of the annular metal reflective electrodes RF2, RF3 and RF4, respectively, the saddle point can be adjusted to move only along the optical axis of the paraboloid because the annular metal reflective electrodes RF2, RF3 and RF4 are in an axisymmetric form.

If the RF saddle point not only deviates from the focus of the paraboloid in the z axis, but also deviates along the x-y plane perpendicular to the z axis, it may be compensated and moved as follows. RF voltages other than DC voltage (with the same phase and the same frequency as those of annular metal reflective electrodes RF2, RF3, RF4) may be applied to the arc-shaped metal reflective electrodes DC1a, DC1b, DC1c, DC1d (or DC5a, DC5b (not shown in the figure), DC5c, DC5d), respectively. The position of the RF saddle point generated by the asymmetric RF voltage ($V\_1a$, $V\_1b$, $V\_1c$, $V\_1d$) will be close to and away from the optical axis in the x-y plane with the voltage magnitude and proportion.

Therefore, the RF saddle point may be compensated in the x-y plane and moved back to the z axis (x=y=0) by adjusting the RF voltage on the arc-metal reflective electrodes DC1a, DC1b, DC1c, DC1d (or DC5a, DC5b (not shown in the figure), DC5c, DC5d).

Figure 6:
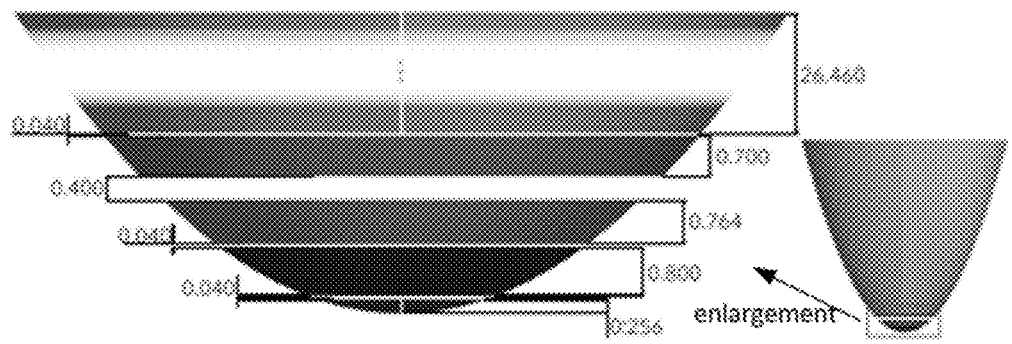
FIG. 6 is a dimensional diagram of each electrode in the ion trap device shown in FIG. 3.
Figure 7:
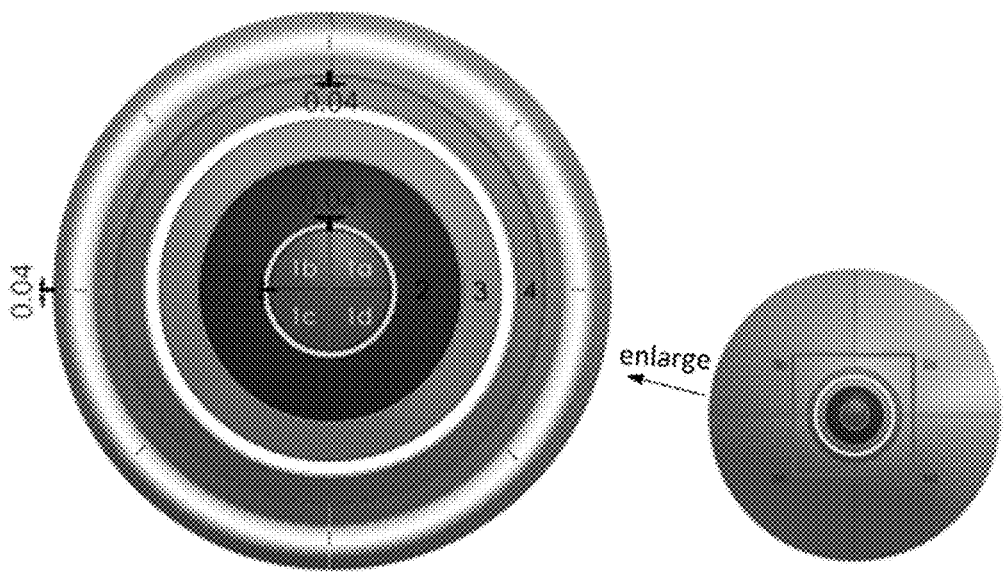
FIG. 7 is a plan view of each electrode in the ion trap device shown in FIG. 3.

FIG. 6 is a dimensional diagram of each electrode in the ion trap device shown in FIG. 3. FIG. 7 is a plan view of each electrode in the ion trap device shown in FIG. 3. A paraboloid with focal length f=2.1 mm is shown in FIG. 6. See FIG. 6 for the implementation size of the paraboloid. The focus of the paraboloid is in the gap between electrodes 3 to 4. The first electrode is divided into four equal segments, the size of which is shown in FIG. 6, and the gap interval is 40 μm. The width of the lowest arc-shaped metal reflective electrodes DC1a, DC1b, DC1c and DC1d (collectively referred to as electrode 1) is 0.256, the width of the annular metal reflective electrode RF2 (electrode 2 for short) is 0.8, the width of the annular metal reflective electrode RF3 (electrode 3 for short) is 0.764, and the width of the annular metal reflective electrode RF4 (electrode 4 for short) is 0.7. The width of the arc-shaped metal reflective electrodes DC5a, DC5b, DC5c and DC5d (collectively referred to as electrodes 5) is 24.46. As shown in FIGS. 6 and 7, the gap between each electrode is 0.04. In the above, the unit is mm.

Figure 8:
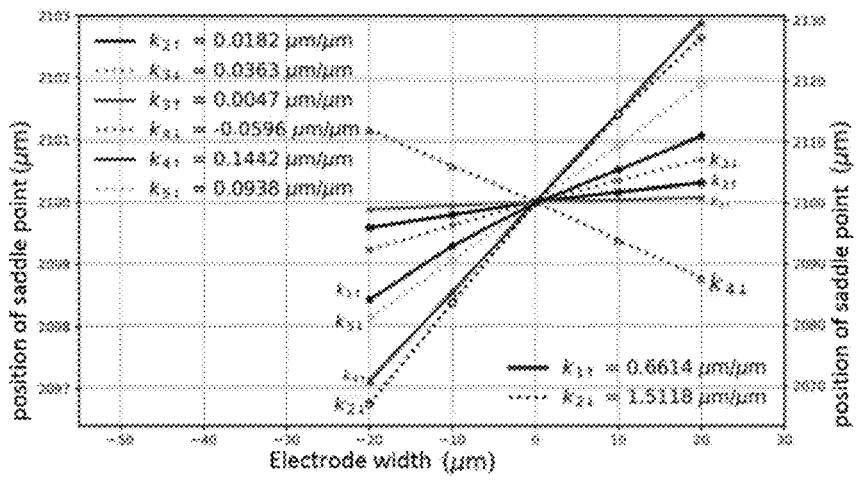
FIG. 8 is a graph of the position change of the saddle point in the z axis direction when each electrode has different widths.

FIG. 8 is a graph of the position change of the saddle point in the z axis direction when each electrode has different widths. As shown in FIG. 8, k2 represents the slope value of the curve of the influence of the width change of the electrode 2 on the moving distance of the saddle point. The arrow pointing upwards indicates that the saddle point moves in the positive direction to the z axis, and so on for the meaning of other curves. When different electrode sizes change, the position of the saddle point will be influenced, so the movement of the saddle point may be counteracted by combining different electrode sizes, and the "coincidence design of the saddle point and the focus" under different structural sizes can be realized.

In an embodiment, by changing the RF voltage on electrodes 2 to 4, the position of the RF saddle point in the z axis direction (optical axis direction) can be changed. The electrodes 2 to 4 are all in the shape of ring band. Because of the axial symmetry, the saddle point can only move along the z direction. The movement of the RF saddle point in the x-y plane can be realized by adding the same or different RF voltage to the four arc-shaped metal reflective electrodes of electrode 1, respectively. At this time, the application of RF voltage will also change the position of the saddle point in the z direction. The position of the saddle point in the z direction may be further compensated by changing the RF voltage of electrodes 2 to 4, so that the saddle point can be moved in any direction.

In an embodiment, taking any of the sub-electrodes of electrode 1 (such as 1a) for example, if only a weak RF voltage V_1a is applied to 1a, the saddle point will move in the direction of (−1,−1), and the moving distance is proportional to the applied voltage V_1a. Similarly, applying RF voltage to 1b, 1c and 1d will move the saddle point in the directions of (1,−1), (1, 1) and (−1, 1), respectively. According to the vector synthesis rule, the saddle point movement in any direction in the x-y plane may be realized by applying different RF voltages to four sub-electrodes. A simple analysis shows that all movements may be realized by applying a RF voltage to two adjacent electrodes.

Figure 9:
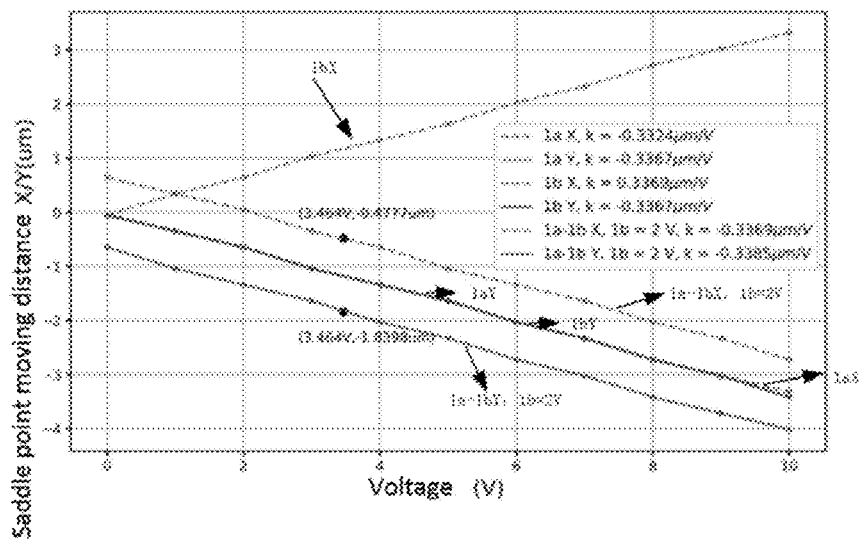
FIG. 9 is a graph of the position change of the saddle point in x and y directions when different RF voltages are applied to different electrodes.
Figure 10:
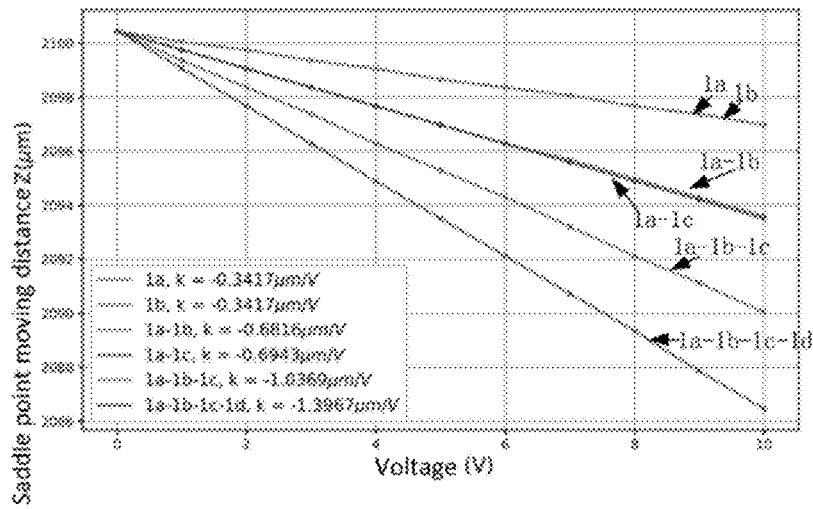
FIG. 10 is a graph of the position change of the saddle point in the z axis direction when different RF voltages are applied to different electrodes.

For example, in the range of 0 to 10 V RF voltage, the relationship between the voltage magnitude and the saddle point moving distance in the x, y and z directions during the application of voltages to a single electrode and two adjacent electrodes is shown in FIGS. 9 and 10.

FIG. 9 is a graph of the position change of the saddle point in x and y directions when different RF voltages are applied to different electrodes. As shown in FIG. 9, the 1ax curve refers to the relationship between the application of different RF voltages to the DC1a electrode shown in FIG. 3 and the moving distance of the saddle point in the x axis direction. 1a-1bX, 1b=2V refers to the relationship between the application of 2V RF voltage to the electrode DC1b shown in FIG. 3 along with the application of different RF voltages to the electrode DC1a and the moving distance of the saddle point in the x axis direction, and so on for other curves.

FIG. 10 is a graph of the position change of the saddle point in the z axis direction when different RF voltages are applied to different electrodes. As shown in FIG. 10, the curve 1a refers to the relationship between the application of different RF voltages to the DC1a electrode shown in FIG. 3 and the moving distance of the saddle point in the z axis direction. 1a-1b refers to the relationship between the application of different RF voltages to the electrodes DC1a and DC1b shown in FIG. 3 and the moving distance of the saddle point in the z axis direction, and so on for other curves.

Figure 11:
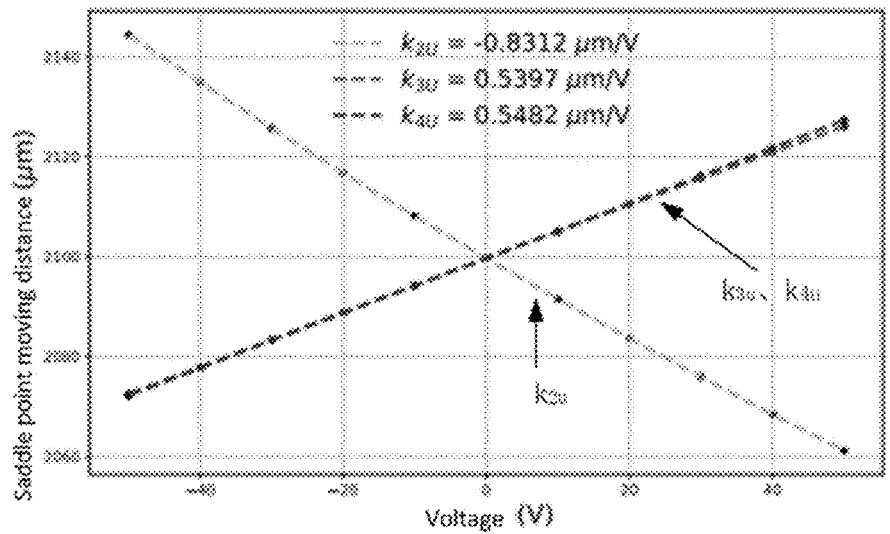
FIG. 11 is a graph of the position change of the saddle point in the z axis direction when different RF voltages are applied to electrodes 2 to 4.
Figure 19:
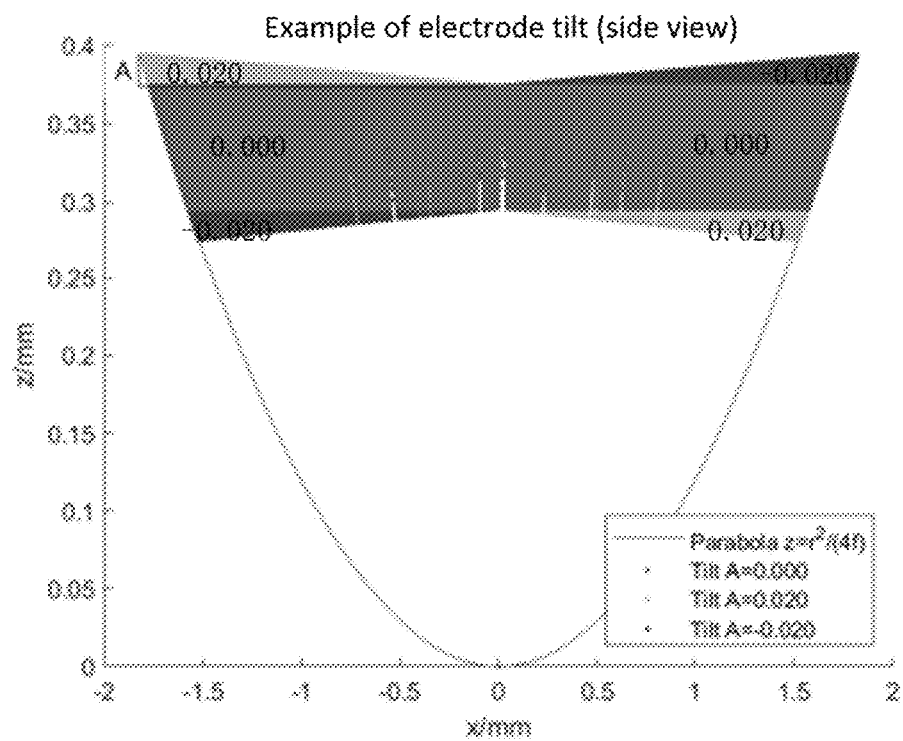
FIG. 19 is a schematic diagram of electrode tilt.

FIG. 11 is a graph of the position change of the saddle point in the z axis direction when different RF voltages are applied to electrodes 2 to 4. The voltage-saddle point movement rate is <1 μm/V, and the voltage source accuracy is 1 mV, which can realize saddle point movement of <1 nm. When the electrode rotates and tilts along the y axis, the influence of the offset of the saddle point on the x and z axes is shown in FIG. 19. A=0.000 represents no tilt, A=−0.020 represents negative tilt, and A=0.020 represents a positive tilt angle.

Figure 20:
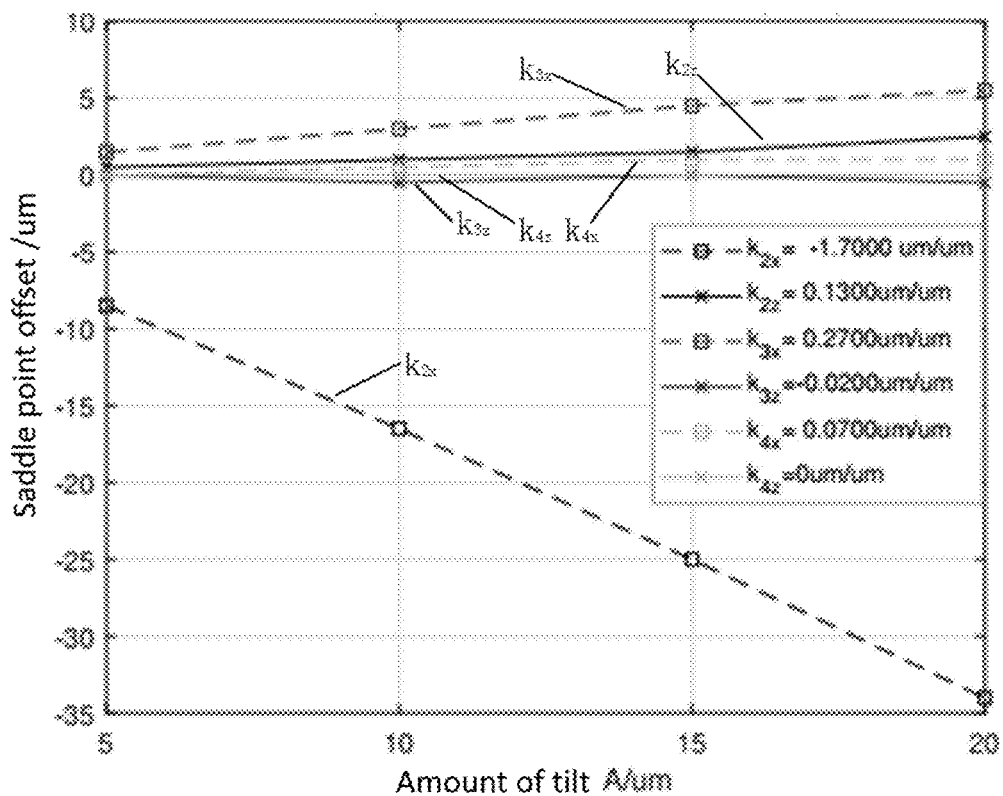
FIG. 20 is a schematic diagram of the relationship between the amount of electrode tilt and the saddle point offset.

The relationship between the saddle point movement and the parameter A, which marks the amount of tilt, is shown in FIG. 20, where the legend is the slope of the curve. The annular electrode tilt and parameter A are defined by the following formula:

$$x' = \cos(\phi) \cdot \sqrt{4 \cdot f \cdot (z - A \cdot \cos(\phi))}$$
$$y' = \sin(\phi) \cdot \sqrt{4 \cdot f \cdot (z - A \cdot \cos(\phi))}$$
$$z' = z - A \cdot \cos(\phi)$$

where x', y' and z' are the coordinates of any point on the tilted annular electrode. f is the focal length of the paraboloid. The coordinates of the front tilted annular electrode are indicated by the cylindrical coordinate system, q is the angular position of any point on the annular electrode, z is the axial z-direction coordinate of any point on the annular electrode (the z coordinate is the same as the z coordinate in parabolic coordinate system), and A indicates the amount of tilt, when A=0, there is no tilt at all, when A>0, the electrode tilt is as shown in light gray, and when A<0, the electrode tilt is as shown in dark gray.

In an embodiment, after the RF saddle point is compensated and moved back to the focus of the paraboloid, it is necessary to adjust the ion equilibrium position by using a DC voltage, so that the electrostatic field equilibrium position coincides with the saddle point to eliminate the micro-motion of ions. Therefore, the final imaging quality and resolution can reach the diffraction limit. Specifically, positive and negative DC voltages are respectively applied to at least two arc-shaped metal reflective electrodes in the same direction (for example, the x direction) to control the ion equilibrium position to move along the direction (for example, the x direction).

Taking the ion trap device shown in FIG. 3 as an example, DC compensation voltages may be divided into three groups, and each group can independently compensate micro-motion in one direction.

Group a compensation voltage +U_1 is applied to four electrodes (1a,5a, 1d,5d), and −U_1 is applied to (1b,5b, 1c,5c), which can independently compensate the micro-motion in the x direction. Because the voltage of the two sub-electrodes (1a, 1d) on the electrode 1 is +U_1 and the voltage of the two sub-electrodes (1b, 1c) is −U_1, the positive and negative voltages are equal with regard to the influence on the movement of the equilibrium point in the z direction, and the resultant is 0, so it only moves along the x direction.

Group b compensation voltage +U_2 is applied to four electrodes (1a, 1b,5a,5b) and −U_1 is applied to four electrodes (1c, 1d,5c,5d), which can independently compensate the micro-motion in the y direction. Similar to the principle of group a, the positive and negative voltages of the two pairs of sub-electrodes are cancelled, and the resultant in the z direction is zero. Therefore, the equilibrium point can be moved only along the y direction.

Group c compensation voltage +U_3 is applied to the four electrodes (1a, 1b, 1c,1d), and −U_3 is applied to (5a,5b, 5c,5d), which can independently compensate the micro-motion in the z direction. Due to the axial symmetry, the electrode 1 and the electrode 5 are both axial symmetry electrodes, so the effective electric field in the x-y plane cannot be generated. Therefore, this group of voltages can only move the equilibrium point along the z direction.

After three groups of voltages that compensate the three directions independently are determined, voltages may be applied to the three groups of electrodes according to the magnitude and direction of actual ion micro-motion. The voltage actually applied by each sub-electrode is the algebraic sum of the voltages of the three groups of voltages on the sub-electrode. FIG. 12d shows the effectiveness of this method.

Figure 12:
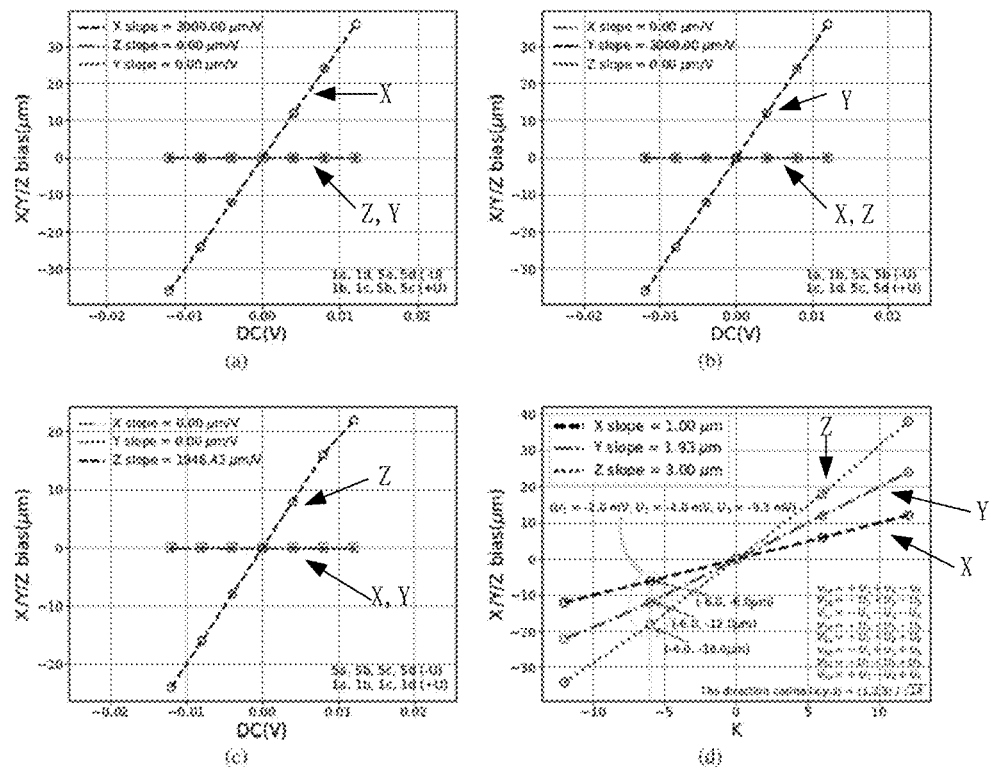
FIG. 12 is a graph of the position change of the ion equilibrium position in the x axis direction, the y axis direction and the z axis direction when different DC voltages are applied to different electrodes.

FIG. 12 is a graph of the position change of the ion equilibrium position in the x axis direction, the y axis direction and the z axis direction when different DC voltages are applied to different electrodes. In the ion trap device shown in FIG. 3, −U is applied to 1a, 1d, 5a, 5d, and +U is applied to 1b, 1c, 5b, 5c. The relationship between the moving distance of the ion equilibrium position in the X, Y, and Z axes and the DC voltage U is shown in FIG. 12a. In the ion trap device shown in FIG. 3, −U is applied to 1a, 1b, 5a, 5b, and +U is applied to 1c, 1d, 5c, 5d. The relationship between the moving distance of the ion equilibrium position in the X, Y, and Z axes and the DC voltage U is shown in FIG. 12b. In the ion trap device shown in FIG. 3, −U is applied to 5a, 5b, 5c, 5d, and +U is applied to 1a, 1b, 1c, 1d. The relationship between the moving distance of the ion equilibrium position in the X, Y, and Z axes and the DC voltage U is shown in FIG. 12c. FIG. 12d shows the relationship between the actual moving distance of the ion equilibrium position in the X axis direction, the Y axis direction and the Z axis direction and the expected moving distance k in the assumed moving direction (direction cosine (1,2,3)) when specific DC voltages are applied to 1a, 1b, 1c, 1d, 5a, 5b, 5c and 5d. To move a distance k on a specific direction cosine, several voltages U1, U2 and U3 may be calculated according to the method, and then the combined voltages V1a-V5d are applied at the same time to verify whether the actual equilibrium position movement is consistent with that when a single voltage is applied. The purpose is to verify whether the combined electrode voltage results in the same effect as applying a voltage to one single electrode alone.

FIG. 13 is a schematic diagram of the RF voltage of electrodes 1 to 5, the frequency and the parameters of ions to be trapped provided by an embodiment of the present disclosure. For example, the RF voltage of electrode 1 may be 0.35 V, and the RF voltage of electrode 2 may be 819.2 V.

The ion trap device provided by the embodiments of the present disclosure integrates a paraboloid with high reflectivity and an ion trap electrode, making the whole structure more compact, easy to be miniaturized and integrated, and is suitable for use as a node device of a quantum network. The ion trap device uses the adjustment of the RF voltage to realize the movement of the saddle point of the RF electric field without mechanical devices. And the moving accuracy depends on the voltage adjustment accuracy and stability of the RF signal source. The RF saddle point movement accuracy better than 100 nm can be realized. At the same time, the PID feedback locking device may be used to monitor and stabilize the RF saddle point in real time. The device can move the RF saddle point in three directions at the same time, which is greatly improved compared with the previous device that can only move the ion saddle point in the optical axis direction. By using the characteristic that different RF voltages can simultaneously compensate RF saddle points in three directions, the constraint on the machining accuracy of paraboloid and its top electrode can be relaxed, which makes the structure easier to realize. The parabolic ion trap has a high efficiency of light collection close to 4π solid angle, which can greatly improve the probability of successfully collecting single photon radiated by ion, thus improving the probability of success and the speed of preparation of ion-photon entangled state and ion-ion entangled state. After the structure is processed and formed, the secondary assembly of electrodes is not needed, which simplifies the operation and avoids assembly errors caused by assembling.

The saddle point movement mode of the ion trap device provided above may be applied to a variety of ion trap systems, such as a segmented quadrupole trap, a blade ion trap or a needle-shaped ion trap. These ion trap devices include a plurality of electrodes insulated from each other. By applying a RF voltage with the same phase, the same frequency and an adjustable amplitude to each electrode, the saddle point can be controlled to move independently in three dimensions.

The saddle point is controlled to move independently in the z axis direction by simultaneously applying RF voltages with a same phase, a same frequency and a same amplitude increment to a plurality of the electrodes symmetrical with respect to the z axis in the x-y plane. The saddle point is controlled to move independently in a direction close to the z axis or away from the z axis in a plane perpendicular to the z axis by simultaneously applying RF voltages with a same phase, a same frequency and an adjustable amplitude to the electrodes in the x-y plane. By applying positive and negative DC voltages to at least two electrodes in the same direction (for example, the x direction), respectively, the ion equilibrium position can also be controlled to move in the direction (for example, the x direction).

FIG. 14 is a structural schematic diagram of a segmented quadrupole trap. The saddle point can be moved in the −x direction by adding an in-phase RF voltage V_RF1 to the RF1 electrode. The saddle point can be moved in the y direction by applying an in-phase RF voltage V_RF2 to the RF2 electrode. The saddle point can be moved in the +x direction by applying a RF voltage V_RF3 to the RF3 electrode. The saddle point can be moved in the −y direction by applying a RF voltage V_RF4 to the RF4 electrode. The same method may also be performed on DC11-DC14, but at this time, it will not only move the saddle point in the x-y plane, but also move the saddle point along the z direction. At this time, it is also necessary to apply the corresponding DC21-DC24 with RF voltages with the same amplitude and the same phase to push the saddle point back to its original position, or move the saddle point to the appropriate position in the z direction by applying different RF voltages. It should be noted that the frequencies and phases of all RF voltages applied to the electrodes should be exactly the same.

After the RF saddle point is moved to the required position, the ion equilibrium position can also be adjusted by using a DC voltage, so that the electrostatic field equilibrium position coincides with the saddle point to eliminate the micro-motion of ions, so that the final imaging quality and resolution can reach the diffraction limit.

As shown in FIG. 14, when the DC voltage +U1 is applied to electrodes DC11 and DC21, and the DC voltage −U1 is applied to electrodes DC13 and DC23 (i.e., DC11=DC21=+U1, DC13=DC23=−U1), the ion equilibrium position moves in the −x direction. When the DC voltage +U2 is applied to electrodes DC12 and DC22, and the DC voltage −U2 is applied to electrodes DC14 and DC24 (i.e., DC12=DC22=+U2, DC14=DC24=−U2), the ion equilibrium position moves in the +y direction.

When DC11=DC12=DC13=DC14=+U3, and DC21=DC22=DC23=DC24=−U3, the ion equilibrium position moves in the +z direction.

Figure 16:
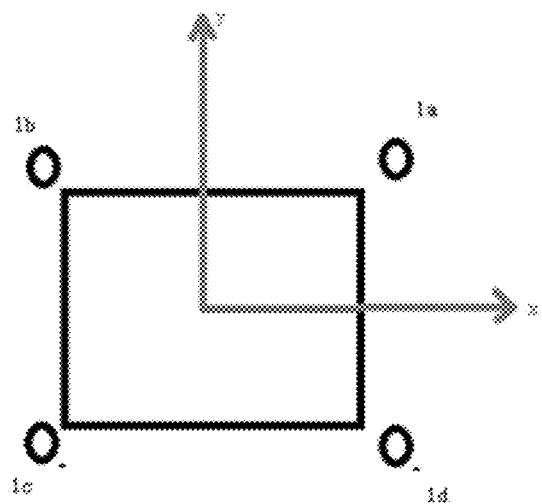
FIG. 16 is a schematic diagram of the movement of the ion equilibrium position of the ion trap shown in FIG. 15.

Taking the quadrupole rob ion trap shown in FIG. 15 as an example, when +U1=(1a, 1b) and −U1=(1c, 1d), that is, referring to FIG. 16, when the DC voltage +U1 is applied to the electrodes 1a and 1b, and the DC voltage −U1 is applied to the electrodes 1c and 1d, the ion equilibrium position moves only along the −y direction. Referring to FIG. 16, the electrodes 1b and 1c may be considered to be in the same direction (y direction), and the electrodes 1a and 1d are in the same direction (y direction). Similarly, when +U2=(1a, 1d) and −U2=(1b, 1c), the ion equilibrium position only moves along the −x direction. The independent movement in the +z direction may be realized by applying voltages +U3=(e1) and −U3=(e2) to the end cap electrodes e1 and e2, that is, applying the DC voltage +U3 to the electrode e1 and the DC voltage-U3 to the electrode e2, so that the ion equilibrium position only moves along the +z direction.

Figure 17:
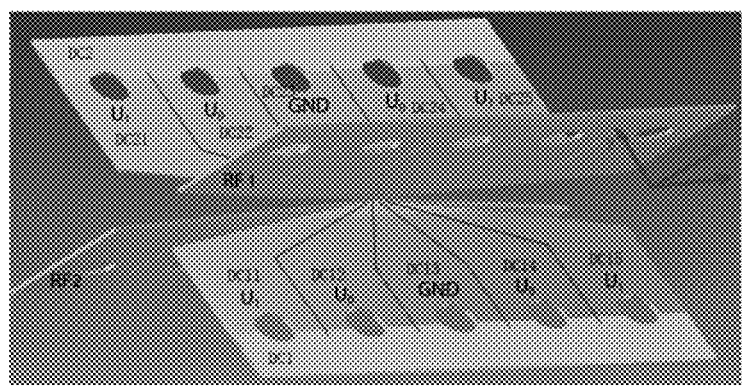
FIG. 17 is a structural schematic diagram of a blade ion trap.

FIG. 17 is a structural schematic diagram of a blade ion trap. As shown in FIG. 17, when RF1=−U1 and RF2=+U1, the ion equilibrium position moves along the +x axis; when DC1=+U2 and DC2=−U2, the ion equilibrium position moves along the +y axis; and when DC12=DC22=+U3 and DC14=DC24=−U3, the ion equilibrium position moves along the +z axis direction.

Figure 18:
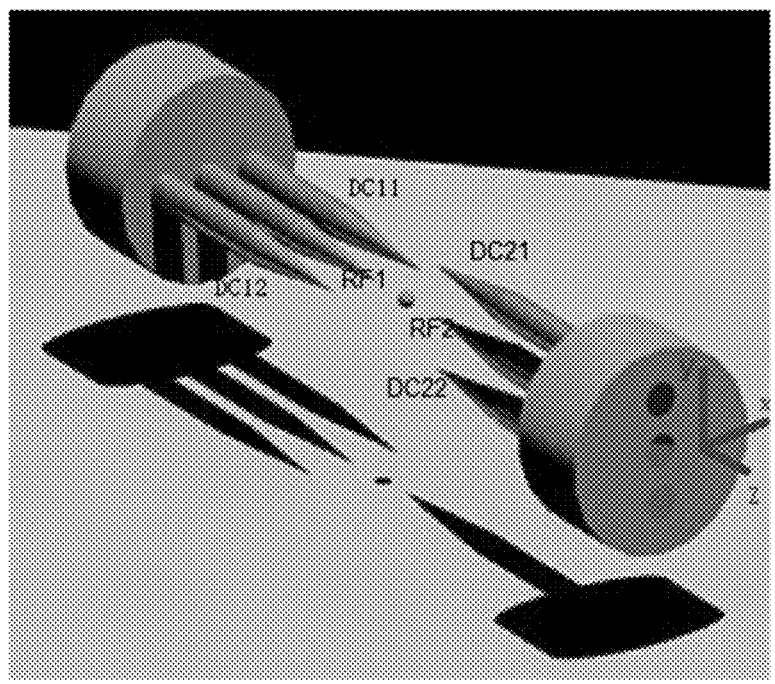
FIG. 18 is a structural schematic diagram of a needle-shaped ion trap.

FIG. 18 is a structural schematic diagram of a needle-shaped ion trap. As shown in FIG. 18, when DC11=−U1 and DC12=+U1, the ion equilibrium position moves along the x axis direction; when DC21=−U1, DC22=+U1, the ion equilibrium position moves along the y axis; and when DC11=DC12=+U3, DC21=DC22=−U3, the ion equilibrium position moves along the z axis.

To sum up, the moving mode of the saddle point and ion equilibrium position provided by the embodiments of the present disclosure can not only move the trapped RF electric field saddle point generated by the electrode in the z direction (along the optical axis direction), but also realize the movement of the trapped RF saddle point in the direction perpendicular to the optical axis z (that is, in the x-y plane), so that the trapped RF saddle point can be accurately moved to any required position in the three-dimensional space, and the perfect coincidence between the saddle point of the trapped RF electric field and the focus can also be realized. Further, by changing the DC voltages to different electrodes, the ion equilibrium position can be moved independently in three dimensions, so that the perfect coincidence of the ion equilibrium position, the saddle point of the RF electric field and the focus can be realized, thus the success rate of photon bits in the process of preparation of quantum entangled state can be improved.

What is claimed is:

1. An ion trap device, comprising:
    an insulating substrate, the insulating substrate having a concave structure; and
    at least two arc-shaped metal reflective electrodes, the arc-shaped metal reflective electrodes covering a front surface of the insulating substrate, the front surface being a concave surface, and the arc-shaped metal reflective electrodes being electrically insulated from each other, wherein
    each of the arc-shaped metal reflective electrodes is configured to receive a RF voltage with a same frequency, a same phase and an adjustable amplitude.

2. The ion trap device according to claim 1, wherein the ion trap device further comprises a plurality of contact electrodes located on a back surface of the insulating substrate, the insulating substrate is provided with through holes, and each of the arc-shaped metal reflective electrodes is connected to respective one of the contact electrodes one by one through respective one of the through holes.

3. The ion trap device according to claim 1, wherein at least two of the arc-shaped metal reflective electrodes are in a same plane, and the plane is perpendicular to an optical axis of the insulating substrate.

4. The ion trap device according to claim 3, wherein at least two of the arc-shaped metal reflective electrodes are symmetrical with respect to the optical axis of the insulating substrate.

5. The ion trap device according to claim 1, further comprising
    at least one annular metal reflective electrode, wherein the annular metal reflective electrode covers the front surface of the insulating substrate and is electrically insulated from the arc-shaped metal reflective electrodes; each annular metal reflective electrode is symmetrical with respect to an optical axis of the insulating substrate; and each annular metal reflective electrode is configured to receive a RF voltage with a same frequency, a same phase and an adjustable amplitude.

6. The ion trap device according to claim 5, further comprising a plurality of contact electrodes located on a back surface of the insulating substrate, wherein the insulating substrate is provided with through holes, and each annular metal reflective electrode is connected to respective one of the contact electrodes one by one through respective one of the through holes on the insulating substrate.

7. The ion trap device according to claim 5, wherein at least three of the arc-shaped metal reflective electrodes are in a first plane, at least one of the annular metal reflective electrode is in a second plane, and the first plane and the second plane are perpendicular to the optical axis of the insulating substrate.

8. The ion trap device according to claim 1, wherein the concave structure is any one of a paraboloid, a sphere, a cylinder and an ellipsoid.

9. The ion trap device according to claim 1, wherein the number of the arc-shaped metal reflective electrodes is 4n segments, and every four of the arc-shaped metal reflective electrodes is a group, wherein n is a positive integer greater than or equal to 1; and multi-segment arc-shaped metal reflective electrodes in a same group are in a same plane and symmetrical with respect to the optical axis of the insulating substrate, and the plane is perpendicular to the optical axis of the insulating substrate.

10. The ion trap device according to claim 1, wherein at least three of the arc-shaped metal reflective electrodes are in a first plane, at least one of the arc-shaped metal reflective electrodes is in a second plane, and the first plane and the second plane are perpendicular to an optical axis of the insulating substrate.

\* \* \* \* \*